May 18, 1954    H. A. ALEXANDERSON ET AL    2,678,642
CONTROL DEVICE AND SYSTEM
Filed May 29, 1945            5 Sheets-Sheet 2

Fig. 2.

INVENTORS
Howard A. Alexanderson
Robert Z. Hague.
BY
Herbert L. Davis, Jr.
ATTORNEY

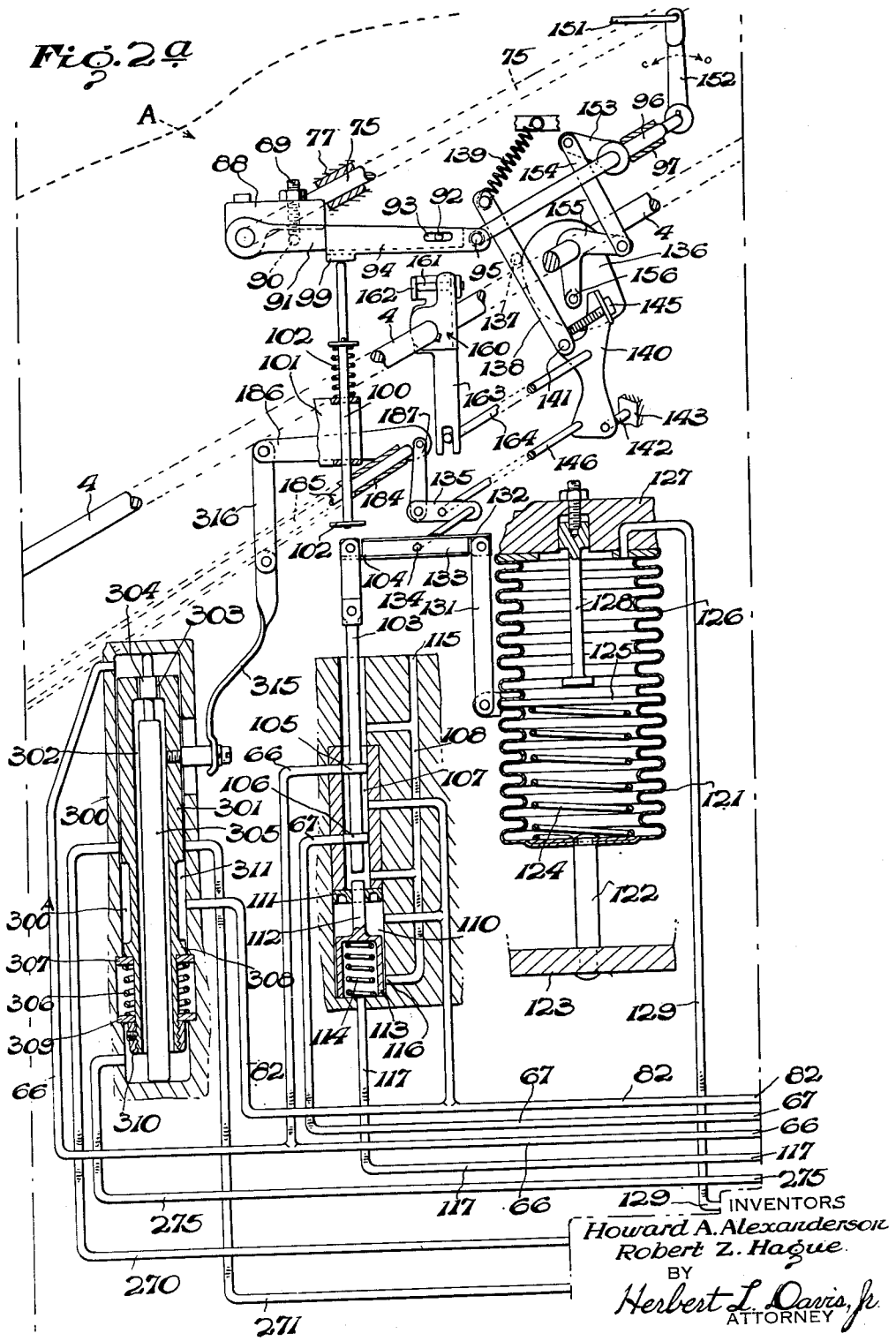

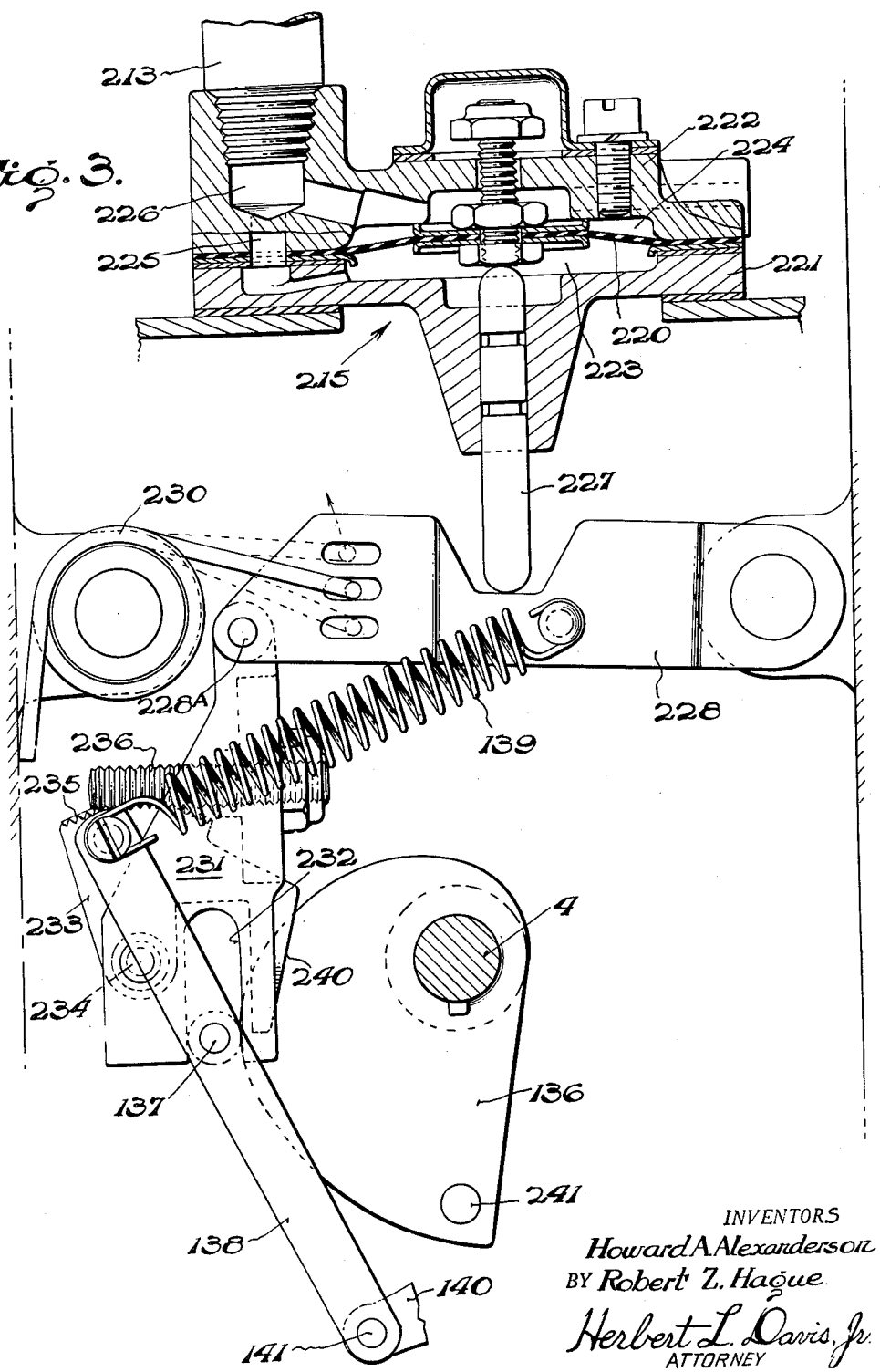

Patented May 18, 1954

2,678,642

UNITED STATES PATENT OFFICE 2,678,642

CONTROL DEVICE AND SYSTEM

Howard A. Alexanderson, Wood-Ridge, and Robert Z. Hague, Oradell, N. J., assignors to Bendix Aviation Corporation, Teterboro, N. J., a corporation of Delaware Application May 29, 1945, Serial No. 596,472

35 Claims. (Cl. 123—103)

The present invention relates to improved control devices and systems for the power units of aircraft, particularly of the supercharged internal combustion engine type arranged for driving an automatically controlled variable pitch propeller.

An object of the present invention is to provide a novel and improved control mechanism for an aircraft engine, which provides means for effecting simultaneously, selection of engine R. P. M.; selection of the intake manifold pressure of an internal combustion engine, and novel means for modifying the relationship between engine R. P. M. and manifold pressure in the cruising power ranges for the best fuel economy.

Another object of the invention is to provide a novel engine throttle control operable to maintain a preselected intake manifold pressure and including means operable upon the throttle being adjusted to its maximum open position to control the speed of a supercharger so as to maintain the selected intake manifold pressure.

Another object of the invention is to provide novel manually controlled motor means for positioning an engine throttle valve.

Another object of the invention is to provide means for effecting direct manual control of the throttle upon failure of the normally operative motor system for controlling the throttle.

Another object of the invention is to provide a novel hydraulic follow-up mechanism for changing the selected intake manifold pressure upon change in the supercharger speed so as to maintain stability of control.

Another object of the invention is to provide a novel hydraulic control device for effecting intake manifold pressure through sequential control of the throttle and supercharger speed.

Another object of the invention is to provide a novel follow-up mechanism including means for effecting rapid acceleration of the supercharger speed upon a great increase in the intake manifold pressure being required to meet the selected pressure.

Another object of the invention is to provide novel means for effecting sequential control of a supercharger from a low speed hydraulic drive to a high speed hydraulic drive.

Another object of the invention is to provide a novel hydraulically operated means for controlling the intake manifold pressure of an aircraft engine.

The above and other objects and advantages of the present invention will appear more fully hereinafter from a consideration of the detailed description which follows, taken together with the accompanying drawings wherein the features of the present invention are illustrated. It is to be expressly understood, however, that the drawings are for the purpose of illustration only and are not designed as a definition of the limits of the invention.

In the drawings wherein like reference characters refer to like parts throughout the several views:

Figure 2 is a diagrammatic view of part of the control mechanism shown in Figure 1;

Figure 2a is a diagrammatic view of a second part of the control mechanism;

Figure 3 is an enlarged view of the pressure reset mechanism.

Figure 1:
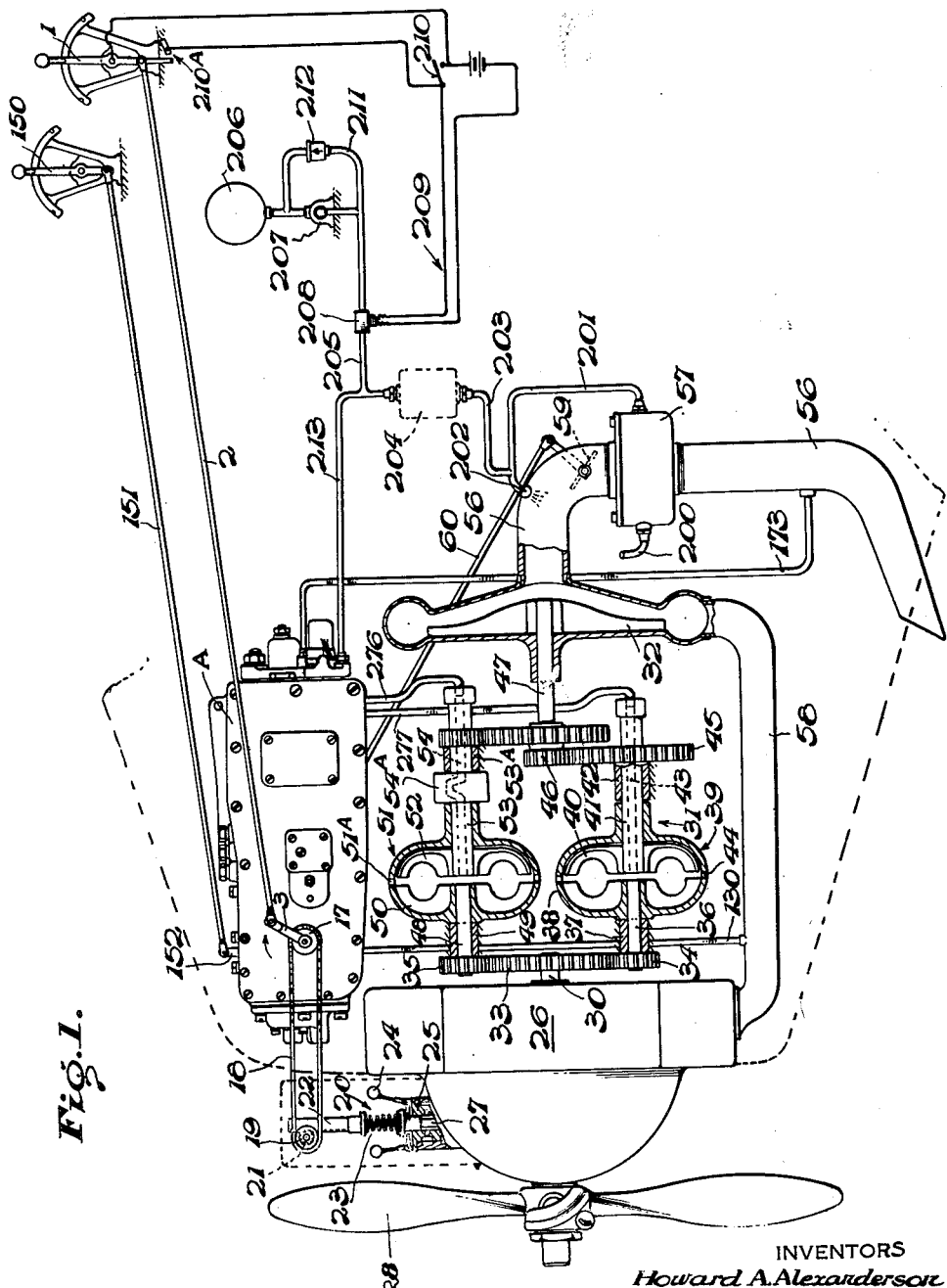
Figure 1 is a diagrammatic view of the novel hydraulic control system.

Referring to the drawings there is provided in the present invention a main pilot's control lever 1, which is connected by a link 2 to an operative control lever 3. As shown in Figure 2, the control lever 3 is keyed to a main control shaft 4 which extends into the main control unit indicated in Figure 1 by the letter A and shown diagrammatically in Figure 2.

Driven by shaft 4 is a propeller pitch governor selector mechanism indicated generally by numeral 5 and including an arm 6 keyed at one end to the shaft 4 and pivotally connected by a link 7 to an arm 8 rotatably mounted on a shaft 9 eccentrically affixed to one end of an adjustable pin 10. The pin 10 is mounted in a casing of the unit A part of which is shown at 10A.

There is further rotatably mounted on the pin 10 an arm 11. The arm 11 is bent at an acute angle at 12 and pivotally connected to one end of a link 14. The arm 11 is connected to arm 8 by an idler shaft 13. The idler shaft 13 extends from points intermediate the opposite ends of arms 11 and 8 and is affixed eccentrically to a cam 13A rotatably mounted in arm 11.

The other end of link 14 is connected to an arm 15 which is keyed to one end of a tubular sleeve 16 rotatably mounted on the shaft 4. The opposite end of the sleeve 16 is keyed to a pulley 17 which as shown in Figure 2 is drivingly connected through lines 18 to an operating pulley 19 for adjusting a propeller pitch governor control indicated generally by the numeral 20.

The latter propeller pitch governor control may be of a suitable type well known in the art. The same is shown in Figure 1 as being of a type having the operating pulley 19 mechanically connected to a gear 21 and rack 22 for adjusting a governor spring 23 and fly-weight governors 24. The fly-weights 24 are pivotally mounted at one end of a shaft 25 drivingly connected through suitable gear means (not shown) to a drive shaft of an aircraft engine indicated by the numeral 26.

Slidably mounted in the shaft 25 is a valve 27 of conventional type, adjustably positioned under tension of the spring 23 and the counter-acting biasing force of the centrifugally actuated fly-weights 24. The valve 27 is arranged to control the operation of a piston not shown which controls the pitch of a propeller 28 driven by the engine 26 in a manner well known in the art.

Thus the engine speed or R. P. M. of the engine 26 may be adjusted by varying through the pulley line 18 the tension of the governor spring 23 and the resultant position of the pilot valve 27. Moreover through the propeller pitch selector mechanism indicated by numeral 5 the relationship of pilot's control lever 1 travel to propeller pitch governor drive travel may be modified by adjustment of the eccentric pin 10 to accommodate production variations in the angular travel of propeller governors 29.

The engine 26 also drives through a shaft 30 and a two speed hydraulic coupling 31 a supercharger 32.

The coupling 31 includes a gear 33 keyed to the shaft 30 and driving high speed coupling gear 34 and low speed coupling gear 35.

The high speed coupling gear 34 drives through a shaft 36 rotatably supported by a bearing 37 one set of blades 38 of a hydraulic coupling 39 of conventional type. The opposite cooperating blades 40 of the coupling 39 are fastened to a driven shaft 41 rotatably supported by a bearing 42. The shaft 41 has a fluid inlet passage 43 leading into the coupling 39 for a purpose to be explained hereinafter. There is further provided in the fluid coupling 39 a fluid outlet port 44 through which the hydraulic fluid may be returned from the coupling 39 to a suitable sump not shown.

Keyed to the driven shaft 41 is a high speed gear 45 which drives through gear 46 the drive shaft 47 of the supercharger 32.

The low speed coupling gear 35 drives through a shaft 48 rotatably supported by a bearing 49 one set of blades 50 of a hydraulic coupling 51 of similar type to coupling 44 and having fluid outlet ports 51A. The opposite cooperating blades 52 of the coupling 51 are fastened to a driven shaft 53 rotatably supported by a bearing 53A. The shaft 53 has a fluid inlet passage 54 leading into the coupling 51. The latter passage is controlled by a valve 54A of a type arranged so that when the driven shaft 53 rotates at a speed greater than the driving shaft 48 the passage 54 is closed for a purpose which will be described hereinafter. The coupling and valve may be of a type described and claimed in U. S. Patent No. 2,400,307, granted May 14, 1946 to L. S. Hobbs et al. and assigned to United Aircraft Corporation.

A conduit 56 leads from an airscoop through a carburetor 57 into the air inlet for the supercharger 32. A conduit 58 leads from the air outlet of the supercharger 32 to the intake manifold of the engine 26. A throttle valve 59 controls the air inlet conduit 56.

Figure 2B:
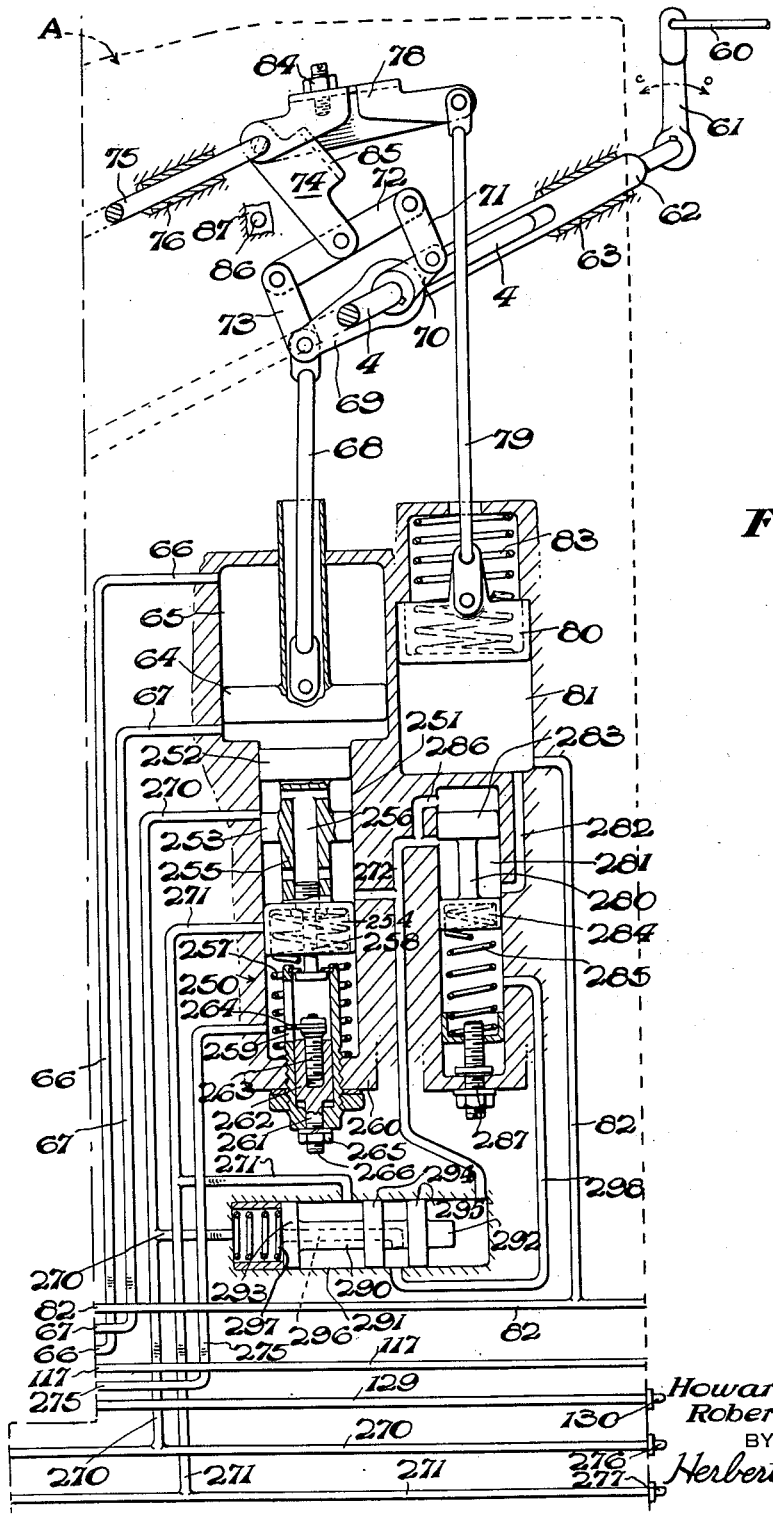
Figure 2b is a diagrammatic view of a third part of the control mechanism.

The throttle valve 59 is controlled by a rod 60 operably connected, as shown in Figure 2b, to a throttle control arm 61.

The throttle control arm 61 is keyed to a shaft 62 rotatably mounted in a bearing formed in the casing of the control unit as indicated at 63. Rotatably mounted in the shaft 62 is one end of the shaft 4.

There is provided a servo piston 64 for operating the throttle 59 through shaft 62. The piston 64 is slidably mounted in a cylinder 65 having fluid pressure inlet passages 66 and 67 opening at opposite sides of the piston 64.

The piston 64 has a piston rod 68 pivotally connected at one end to the piston 64 and at the opposite end pivotally connected to an operating arm 69 formed integral with the rod 62.

Keyed to the pilot's control shaft 4 is a second arm 70 connected through a link 71 to one end of a walking beam 72. The opposite end of the walking beam 72 is connected through a link 73 to the arm 69.

Pivotally connected at a point intermediate the opposite ends of the walking beam 72 is one end of a lever arm 74 which is affixed at the opposite end to a shaft 75.

The shaft 75 is rotatably supported in bearing portions 76 and 77 formed apart of the control unit. Freely rotatable on the shaft 75 is an arm 78. The arm 78 is pivotally connected at the free end to a rod 79 which connects the arm 78 to a piston 80. The latter piston 80 is slidably mounted in a cylinder 81 into which opens at one end a passage 82 leading to a fluid pressure line such as oil under engine pressure. The piston 80 is normally forced under pressure of the oil in an upward direction as viewed in Figure 2b.

A spring 83 is positioned between the piston and the upper end of the cylinder so as to force the piston in a downward direction upon oil pressure failure, whereupon the arm 78 is forced in a clockwise direction. An adjustable screw 84 projects through the arm 78 and is arranged so as to engage an abutment plate 85 on the arm 74 in the latter event so as to restrain movement of the arm 74 in a counterclockwise direction. A stop pin 86 projects from a portion 87 of the casing of the unit so as to restrain the arm 74 from movement in an opposite direction.

The pilot's control lever may then effect manual control of the throttle valve 59 through shaft 4, arm 70, link 71, walking beam 72, link 73, arm 69 and throttle control shaft 62.

The aforenoted manual control feature is described and claimed in U. S. Reissue Patent No. 23,490 granted May 20, 1952 to Howard A. Alexanderson and Robert Z. Hague and assigned to Bendix Aviation Corporation.

The adjustable screw 84 is preferably adjusted so as to permit a small amount of angular travel of lever 74 between screw 84 and stop pin 86. During such manual operation of the throttle 59, lever arm 74 is driven between its restraining stops 84 and 86 rotating shaft 75.

At the opposite end of the shaft 75 there is affixed an arm 88 through which projects an adjustable screw 89. The screw 89 is arranged to engage a pin 90 which projects from an arm 91, supported on shaft 75. The arm 91 is freely rotatable on the shaft 75 and includes a second pin 92 which projects therefrom into a slot 93 formed in an arm 94 freely rotatable on a pin 95 projecting from one end of a shaft 96. The shaft 96 is rotatably supported in a bearing 97 formed apart of the casing of the control unit A.

The arm 94 has an abutment plate 99 which bears upon one end of a plunger 100 slidably supported by bracket portions 101 and biased in an upward direction by spring 102. Lever arm 94 is driven by pin 92 of arm 91 so as to move plunger 100.

The plunger 100 is arranged so as to operably contact at 102 one end of a valve stem 103 which is biased under force of a leaf spring 104 in an upward direction. The valve stem 103 has valve members 105 and 106 arranged so as to control passages 66 and 67 respectively opening into valve chamber 107 and leading to chamber 65 at opposite sides of piston 64 so as to control the movement of the piston 64. The fluid pressure line 82 opens intermediate the openings of passages 66 and 67 to valve chamber 107. A fluid medium outlet or drain passage 108 also opens from the valve chamber 107 at the upper and lower sides of valves 105 and 106 respectively.

Another valve chamber 110 is provided separated from the valve chamber 107 by a sealing member 111. Projecting through the sealing member 111 is a valve stem 112. At the lower end of the valve stem 112 is mounted a cylindrical valve 113 having a spring 114 which tends to bias the valve 113 and stem 112 in an upward direction.

The fluid pressure passage 82 opens into the valve chamber 110 at the upper side of the valve 113 so that during normal operation the fluid pressure medium forces the valve 113 downward into the position shown in Figure 2a. The exhaust passage 108 has a port 115 opening into the housing of the control unit A and a port 116 opening into the chamber 110 but closed by the valve 113 when biased downward to the position shown in Figure 2a. A main drain passage 117 opens into the valve chamber 110. During normal operation the fluid medium is drained from the housing by suitable ports not shown.

When no pressure medium is available or upon oil pressure failure the drain valve 113 which is loaded by spring 114 is moved in an upward direction under force of the spring 114 serving two purposes. It causes the oil in the housing of the control unit A to drain to a predetermined low level by uncovering a drain port 116 so as to permit such drainage through port 115, passage 108, port 116, valve chamber 110 and through passage 117 to the fluid outlet. Secondly the spring 114 urges valve stem 112 upward into contacting relation with the lower end of the valve stem 103 so as to actuate the valve stem 103 in an upward direction.

During such fluid pressure failure, movement of the pilot's control lever 1 so as to move arm 70 in a counter-clockwise direction causes movement in a counter-clockwise direction of the lever arm 74 between its restraining stops 86 and 84 whereupon valve stem 112 under force of spring 113 causes servo valve to move from its neutral position as shown in Figure 2a, to an upper position so as to uncover the ports leading to passages 66 and 67 so as to permit movement of the throttle 59 manually. Similarly upon movement of the lever arm 74 in a clockwise direction between its restraining stops 85 and 86 as upon manual movement of arm 70 in a clockwise direction lever arm 94 actuates through plunger 100 the valve stem 103 in a downward direction opening the ports to passages 66 and 67. It will be seen from the foregoing that the manual operation of the servo valve 103 not only permits the opening of the passage 65 and 67 so that the manual operation of arm 69 and accordingly throttle 59 may be effected, but in the event slight pressure be available such movement of the valve 103 directs such slight pressure so as to effect piston 64 so as to assist the manual movement of the arm 69 and thereby assist in the manual control of throttle valve 59.

*Automatic control of throttle*

When fluid pressure is available in excess of a predetermined value, the piston 80 is moved upward under the pressure medium from passage 82 against the force of spring 83. This latter action forces link 79 upward moving lever 78 in a counter-clockwise direction so as to permit lever arm 74 to move free of the restraining screw 84. Likewise upon such fluid pressure medium becoming effective the valve 113 is moved downward against spring 114 permitting the servo valve 103 to move free of the valve stem 112 under automatic control.

In order to effect the latter automatic control there is provided a pressure responsive bellows assembly including an evacuated bellows 121 supported at one end by a stud 122 carried by a portion 123 of the control unit A.

A spring 124 is positioned within the evacuated bellows 121 tending to expand the same. At the opposite end of the bellows 121 there is provided a movable plate 125 interposed between the bellows 121 and a second bellows 126. The bellows 126 is mounted at the opposite end by a portion 127 of the control unit A. An adjustable pin 128 projects into the bellows 126 from the portion 127 so as to limit the extent of contraction of the bellows 126 for a purpose which will be described hereinafter.

A passage 129 formed in the control unit leads from the interior of the bellows 126 to a conduit 130, shown in Figure 2b. The conduit 130, as shown in Figure 1, leads to the air intake manifold conduit 58. Thus the bellows 126 is controlled by the intake manifold pressure of the engine 26.

The movable plate 125 between the manifold pressure bellows 126 and evacuated bellows 121 is connected through a link 131, leaf spring 132, beam 133 and the leaf spring 104 to the servo valve 103. Beam 133 in the schematic drawing of Figure 2a contains at opposite ends the preloaded leaf springs 104 and 132 which permit deflection of the servo valve 103 by plunger 100 and valve stem 112 without excessively loading the bellows assembly. The beam 133 may however be made in the form of a solid beam and link 131 provided with a preloading mechanism which maintains the link 131 at a fixed length.

The selected pressure or datum of the bellows assembly may be changed by moving a pin 134 on which beam 133 is pivotally supported. Pin 134 is adjusted through operation of a whiffletree type of beam 135 controlled through operation of a pressure selecting mechanism, a cruise override lever; a hydraulic follow-up mechanism; and an altitude droop mechanism as will be described hereinafter.

It will be readily seen however from the foregoing that upon an increase in the intake manifold pressure above the selected pressure there will result an expansion of the manifold pressure bellows 126 causing the beam 133 to be shifted in a clockwise direction whereupon the servo valve 103 will be adjusted upward causing a pressure medium to be applied through the passage 66 to the upper side of the piston 64 and exhausting the lower side through passage 67. This action will cause the piston 64 to be adjusted downward so as to adjust the arm 69 and arm 61 in a counter-clockwise direction moving valve 59 of Figure 1 through rod 60 in a valve closing direction decreasing the intake manifold pressure until the valve 103 is returned to a neutral position. An opposite effect is of course produced upon the intake manifold pressure dropping below the selected value.

Pressure selecting mechanism

As shown in Figures 2a and 3 pressure selector cam 136 is rigidly keyed to a pilot's control shaft 4. Contacting the contour of the selector cam 136 is a cam follower 137 projecting from a follower lever 138. The follower lever 138 is loaded by an extension spring 139 and pivotally mounted on a selector plate 140 at pin 141. The selector plate 140 is pivoted on a pin 142 which projects from a portion 143 of the control unit A.

An adjusting screw 145 is mounted on the selector plate 140 and limits the clockwise rotation of lever 138. The selector plate 140 pivoted on the pin 142 transfers adjustment thereof to the whiffletree 135 through an interconnecting pin 146 projecting from the plate 140 and upon which the whiffletree beam 135 is pivotally mounted. It will be readily seen from the foregoing that with spring 139 pivoting lever 138 at follower 137 in a clockwise direction into contacting relation with adjustment screw 145, the lever 138 and selector plate 140 act as a unit, and the pressure selection of cam 136 is transmitted to the bellows and valve linkage through pin 146, beam 135 and pin 134.

The manifold pressure bellows 126 is provided with the adjustable lock out stop pin 128 previously described. The latter pin 128 is adjusted to a low manifold pressure value below the minimum idling pressure for the engine 26, but above the minimum selected pressure. When pressures are selected by the pilot through operation of the control lever 1 which are less than the lockout setting pressure, the control unit A is locked into manual operation through the joint effect of the pin 128 and 134 causing the adjustment of the valve 103 upward tending to adjust the throttle valve 59 to a closed position. Thus through appropriate manual adjustment of the control lever 1, the throttle 59 may be manually controlled. The lockout stop 128 also permits closing of the throttle 59 in the event of a broken evacuated bellows, since it provides means for placing the control unit into manual operation.

Economy lever control

The economy control, as described and claimed in the copending divisional application Serial No. 129,132, filed November 23, 1949 by Robert Z. Hague and Howard A. Alexanderson and assigned to Bendix Aviation Corporation, includes a pilot's economy control lever indicated in Figure 1 by the numeral 150. The latter lever 150 is connected through a rod 151 to a control arm 152 keyed to the shaft 96 previously described and shown in Figure 2a. Keyed to the shaft 96 is an arm 153 connected by link 154 to a bell crank 155 freely rotatable on the shaft 4'.

The bell crank 155 has a stud 156 projecting therefrom and arranged so that when the economy control lever 150 is rotated so as to move the arm 152 in a counter-clockwise direction to the "cruise" position, the economy bell crank 155 is rotated clockwise so that during operation in the cruising range of power stud 156 will raise lever 138 increasing the selected pressure setting and stud 156 will replace follower 137 as the pivot for the lever 138.

As the pilot's control shaft 4 is rotated in a counter-clockwise direction towards closed throttle, the cruise pressure setting must be reduced at an appropriate point and the pressure setting brought down to the normal selection. In order to effect the latter operation a collar 160 is keyed to the shaft 4 having an adjustable screw 161 arranged so as to contact an end 162 of a lever 163 freely rotatable on the shaft 164 so as to limit the rotation of lever 163 in a clockwise direction. Thus as shaft 4 is rotated in a counter-clockwise direction towards closed throttle, lever 163 is moved by screw 161 at a predetermined adjusted position of the shaft 4 in a counter-clockwise direction so as to apply a load to the selector plate 140 through a pin 164 projecting from the plate 140. As the shaft 4 is adjusted further towards closed throttle position, the plate 140 is adjusted in a clockwise direction about the pivot pin 142 so as to effectively reduce the selected pressure as the control shaft 4 is rotated towards closed throttle position.

When economy control lever 152 is rotated clockwise to the magneto check position, stud 156 contacts an upper projection of selector plate 140, causing the selector plate 140 to move in a clockwise direction and effectively locking the pressure selection at a low value and maintaining the throttle at its minimum position for purposes of checking the magneto. The economy control feature is claimed broadly in the copending application Serial No. 581,878, filed March 9, 1945, by Howard A. Alexanderson and Harold A. Wheeler and assigned to Bendix Aviation Corporation.

Altitude correction droop mechanism

In the present invention there is provided an altitude correction device or droop mechanism shown in Figure 2. The altitude droop mechanism serves in the single stage supercharger system disclosed (where no intercooling is provided) to prevent detonation at high altitude due to high fuel mixture temperature. At sea level a given supercharged intake manifold pressure may not cause detonation due to its relatively lower temperature, while at relatively higher altitudes the same supercharged intake manifold pressure may have a relatively higher temperature. The altitude droop mechanism reduces the selected manifold pressure with increase of altitude to within a safe operating range. Thus at high selected manifold pressures drooping in the selected intake manifold pressure is started at relatively low altitudes and the manifold pressure setting is decreased rapidly with change in altitude.

As lower manifold pressures are selected, drooping in the intake manifold pressure starts at a higher altitude and occurs at a slower rate until at low manifold pressures no correction or droop is required and constant manifold pressure control is provided.

The foregoing operation is effected through a bellows assembly including an altitude bellows 170 opposed by an evacuated bellows 171 including an internal spring 172. The bellows 170 is connected through a conduit 173 to the atmospheric or scoop pressure at the inlet to the conduit 56 as shown in Figure 1.

The position of the plate 174 between the bellows 170 and 171 is an indication of the air inlet or scoop pressure which varies with changes in the altitude of the aircraft and prevailing atmospheric pressure. This indication is transmitted by a lever 175 pivotally supported at 176 and connected at one end to the plate 174 and at the opposite end to a plunger 177. The plunger 177 is slidably mounted in a supporting bearing 178 and is arranged so as to actuate a cam lever 179 pivoted at one end on a fixed pivot 180 and having a plate 181 at the opposite end upon which the free end of the plunger 177 bears. A spring 179A biases the cam lever 179 towards the plunger 177. The spring 179A in actual practice may be in the form of a torsion spring about the pin 180.

A second lever 182 is pivotally supported on a fixed pivot 183. At one end of the lever 182 there is provided a sleeve like bearing 184 formed integral therewith and a pin 185 projecting through said bearing 184 and rotatably connected at one end to the lever 182.

The opposite end of the pin 185 is affixed to a follow-up lever 186 and transmits its motion to the selector whiffletree beam 135 through a link 187 pivotally connected at one end to the follow-up lever 186 and at the opposite end to the beam 135.

Lever 182 is spring loaded in a clockwise direction by a spring 190 which in actual practice may be in the form of a torsion spring about pin 183. The movement of the lever 182 in a clockwise direction is limited by a pin 191. The cam lever 179 transmits its motion to lever 182 through a pin 192 which is formed as an integral part of a link 193. The pin 192 may be adjusted along the surface of the cam lever 179 and between the levers 179 and 182 from a point coinciding with pivot pin 180 to a position at the left thereof. In the former position it will be readily seen that since the pin 192 of link 193 would be rotated at the pivot 180 of the cam lever 193 that motion of the altitude bellows could not transmit any motion to lever 182. However as the pin 192 is adjusted to the left of pivot 180 correspondingly greater movement will be imparted to lever 182.

In order to effect the latter adjustment of the pin 192 the link 193 is pivotally connected to one end of a cam follower arm 195 pivoted on a fixed pin 196 and bearing at the opposite end upon the surface of a cam 197 keyed to the main control shaft 4 under the biasing force of a spring 195A which in actual practice may be in the form of a torsion spring about the pin 196.

It will be seen from the foregoing that as the altitude correction cam 197 is rotated clockwise the cam follower lever 195 is pivoted at pin 196 so as to move link 193 and accordingly pin 192 into a position where the adjustment of cam lever 179 can be transmitted to lever 182. The cam shape provided at the upper surface of cam lever 179 determines the altitude at which motion will be transmitted to the lever 182 for manifold pressure setting. The shape of the cam lever is so arranged that the greater the intake manifold pressure the lower the altitude at which correction is effected and that at very low pressure settings no altitude correction is effected.

The feature of the altitude correction droop mechanism is described and claimed in the copending divisional application Serial No. 111,896, filed August 23, 1949, by Howard A. Alexanderson and Robert Z. Hague and assigned to Bendix Aviation Corporation.

Injection system

As best shown schematically in Figure 1, there is connected to the carburetor 57 a conduit 200 leading from a suitable source of fluid fuel for the aircraft engine. There is also provided a conduit 201 for injecting the fuel into the induction system through a nozzle 202. There is further provided a conduit 203 for injecting into the induction system through nozzle 202 a supplemental or so-called "anti-knock" fluid medium such as water, water alcohol or other suitable fluid well known in the art for suppressing predetonation of the engine 26.

The conduit 203 is connected to a suitable metering device shown in dotted outline and indicated generally by the numeral 204. The latter metering device may be of a suitable type well known in the art for determining the rate of flow of the "supplemental" fluid.

A conduit 205 leads to the metering device 204 from a suitable source of "supplemental" fluid indicated by numeral 206. In the conduit 205, there is provided a pump indicated by numeral 207 driven by a suitable power means not shown. The pump 207 supplies the fluid medium under pressure to the metering device 204.

A valve 208 is provided in the conduit 205 between the pump and metering device 204 for "off" and "on" control of the "supplemental" fluid injection system. The control valve 208 may be of any suitable type, but is shown herein as of an electromagnet controlled type having an electrical control circuit 209 and switch 210 which is preferably mounted within the aircraft cabin for convenient operation by the pilot.

Thus the supplemental fluid injection system may be placed in operation by the pilot closing the switch 210 so as to effect the opening of the valve 208. Conversely, the valve 208 may be closed by opening the switch 210. As shown in Figure 1 the latter circuit may be also closed by the adjustment of the control lever 1 beyond a predetermined range of for example 63 degrees at which point a switch 210A shunted across the switch 210 may be closed by the control lever 1.

A by-pass conduit 211 and relief valve 212 is provided for recirculating the fluid medium from the pump outlet to the pump inlet at such times as the valve 208 is closed and the injection system is not in operation.

A conduit 213 is connected to the conduit 205 between the valve 208 and the metering device 204. The conduit 213 leads into the control unit A to a pressured reset mechanism indicated in Figure 3 by the numeral 215 and described and claimed in a copending application Serial No. 201,729, filed December 20, 1950, by Howard A. Alexanderson and Robert Z. Hague and assigned to Bendix Aviation Corporation.

As shown in Figure 3 the latter mechanism includes a spring loaded differential diaphragm 220 mounted between the casing portions 221 and 222 having chambers 223 and 224 formed at opposite sides of the diaphragm 220. The chamber 223 is open to atmosphere through a port 225 while the chamber 224 is open to the pressure from the fluid medium from the injection system through a port 226 into which opens the conduit 213 leading from the fluid injection system. The diaphragm 220 is operably connected to a pin 227 slidably mounted in the casing portion 221.

The pin 227 bears at one end on the diaphragm 220 and at the opposite end on a pivotally mounted arm 228 biased in an upward direction under force of a spring 230.

Pivotally connected at 228A is a plate 231. The plate 231 has formed therein a longitudinally extending slot 232 which opens at the lower end thereof. Positioned in the slot 232 is a cam follower 137 which projects from the follower lever 138 into the slot 232. The upper end of the follower lever 138 is pivotally connected to a plate 233 adjustably fastened to plate 231. As shown in Figure 3, the plate 233 is pivotally mounted on plate 231 at 234 and has suitable rack teeth 235 screw-threadedly engaged by an adjustable screw member 236 so that the position of the plate 233 and accordingly the cam follower 138 may be initially adjusted in relation to the plate 231. As shown in Figures 2a and 3 the spring 139 is connected at one end to the upper end of follower 138 and at the other end to arm 228 so that the spring 139 during normal operation tends to bias the follower 138 and plate 231 in a counter-clockwise direction about the pivot 228A and the cam follower 137 into contacting relation with cam 136.

It will be readily seen from the foregoing that upon operation of the fluid injection system the fluid medium under pressure entering the chamber 224 will bias the diaphragm 220 downward actuating the lever 228 in a counter-clockwise direction. The latter action will cause the plate 231 to be forced downward in a clockwise direction shifting the cam follower 137 away from the cam 136 and thereby increasing the pressure setting of the bellows 126 to a predetermined value during operation of the injection system.

The plate 231 includes a cam surface 240 which is so arranged that upon adjustment of the control lever to within the range for operation of the fluid injection system a pin 241 projecting from the cam 136 may contact the cam surface 240 and by appropriate adjustment of the control shaft 4 further increase the pressure setting of the unit during operation of the water injection system. The follower 138 being adjusted during the latter operation by the pin 241 acting upon the cam surface 240 so as to adjust the plate 140 in a counter-clockwise direction about the pin 142 through the follower 138 and thereby increase the pressure setting of the bellows 121 and 126.

*Supercharger speed control*

As the valve 103 is adjusted by the bellows assembly from its neutral position there is effected a corresponding adjustment of the piston 64 shown in Figure 2b. As the bellows calls for greater pressure the piston 64 is adjusted upward until the throttle 59 has been adjusted to the fully open position. Piston 64 is of such a size that the same effectively overcomes all throttle loads at a predetermined fluid or oil pressure differential of for example 20 p. s. i. When the piston 64 has opened the throttle 59 fully, if the manifold pressure still remains less than the setting, the fluid pressure differential from passage 67 to 66 will rise above the predetermined pressure value.

A metering piston-valve 250 is provided slidably mounted in a piston chamber 251 opening at one end into the chamber 65 and so arranged that the fluid pressure medium applied to the piston 64 through passage 67 may be also applied to one side of a piston head 252. The piston valve 250 includes the valve members 253 and 254 and valve stem 255 connecting the same. A passage 256 extends through the valve stem 255 and opens at opposite sides of the valve member 253. A spring 257 biases the piston-valve assembly 250 upward. A pin 258 projects downward from the valve 254 and is slidably mounted in a sleeve member 259. The member 259 is screw threadedly engaged in a portion 260 of the control unit A and is arranged so as to limit the upward movement of the piston valve 250. Mounted within the sleeve member 259 is a stem 261 having a nut portion 262 screw-threadedly engaging a screw 263 locked from rotation by a portion 264 engaged in the member 259. The stem 261 is engaged at the outer end by nuts 265 so that the same may be readily locked in adjusted position. There is formed in the outer end of the stem 261 a cleft 266 for adjustment purposes.

By appropriate adjustment of the member 259 and screw 263 the limits of movement of the piston valve 250 may be readily determined.

The valves 253 and 254 are arranged to open in sequence the passages 270 and 271 to pressure medium supplied the valve 250 through pressure conduit 272 as the pressure supplied the chamber 65 through passage 67 exceeds predetermined differential values above the pressure supplied the opposite end of the valve through a passage 275, which as will be later explained equals the pressure in line 66.

The passage 270 opens into a conduit 276 which as shown in Figure 1 supplies fluid medium to the low speed coupling 51 through passage 54 and valve 54A. Similarly the passage 271 opens into a conduit 277 so as to supply fluid medium to the high speed coupling 39 through passage 43.

The hydraulic couplings 51 and 39 serve to couple the driving member 30 to the driven member 47 at varying speed ratios depending upon the rate of fluid flow supplied to the individual coupling which thus determines the slippage of the coupling and its speed ratio.

The metering piston-valve 250 is adjustably positioned by the aforenoted differential pressure so as to properly control the coupling ratio and accordingly the driving speed of the supercharger 32 so as to maintain a preselected intake manifold pressure in the conduit 58 as controlled by the servo-valve 103. By appropriate adjustment of the members 259 and 261 the minimum opening of the low speed passage 270 and the maximum opening of the high speed passage 271 may be conveniently adjusted.

In order to provide a substantially constant pressure in the passage 272 there is provided a reducing valve 280 including a valve chamber 281 having a pressure inlet passage 282 leading from the piston chamber 91 and opening in the chamber 281 at a point between parts 283 and 284 of the valve 280. A spring 285 biases the valve 280 in an upward direction tending to counterbalance the pressure applied at the upper end of valve 280 through a passage 286, while the valve portion 283 tends to open the passage 272 to the pressure medium as the valve 280 is biased upward by the spring 285 so as to increase the pressure applied through passage 286 to a predetermined constant value. The tension of spring 285 may be adjusted by means of a suitable adjusting mechanism 287 so as to vary the maximum flow through passage 270.

It has been found, however, that there is considerable variation in the back pressure in lines 270 and 271 thereby causing a metering error. Novel means to correct this condition, as described and claimed in the copending divisional application Serial No. 111,896, filed August 23, 1949, by Howard A. Alexanderson and Robert Z. Hague, include a shuttle valve 290 provided to connect the pressure in the passage 270 to the lower end of the valve chamber 281 during low speed supercharger operation and the pressure in the passage 271 to the lower end of the valve chamber 281 during high speed supercharger operation. Thus as back pressure increases the valve 280 will tend to increase the opening of the passage 272 so as to compensate for such increase.

The shuttle valve 290 is slidably mounted in a valve chamber 291 and includes a stem portion 292 having valve portions 293, 294 and 295 mounted thereon in spaced relation. A passage 296 extends longitudinally in the stem. One end of the passage 296 opens through the end of the stem 292 into the chamber 291 while the opposite end opens through the side of the stem 292 into the space between the valve portions 294 and 295. The passage 270 opens into the valve chamber 291 at the left of the shuttle valve so that the pressure in the passage 270 together with the force of a spring 297 biases the shuttle valve in the chamber 291 towards the right. At the opposite end of the shuttle valve 290 the pressure passage 272 opens into the valve chamber so as to normally counterbalance the force exerted by the spring 297 and fluid medium from passage 270 and position the valve 290 as shown in Figure 2b.

In the latter position a passage 298 leading from the lower end of the valve chamber 281 opens into the valve chamber 291 between the valve members 294 and 295 so that the passage 270 is connected through passages 296 and 298 to the lower end of the reducing valve 280. There further opens into the valve chamber 291 the passage 271 which opens at a point between valve members 293 and 294 so that in the latter adjusted position of the throttle valve the passage 271 is disconnected from the valve 280.

However, when the pressure in passage 270 exceeds a predetermined value the valve 290 is shifted to the left so as to close passage 296 to passage 298 and open passage 298 to passage 271 so as to shift the reference pressure for the reducing valve 280 from that in passage 270 to the pressure in passage 271.

After the pressure medium has been supplied the high speed coupling 39 through passage 270 and 39 starts to over drive the low speed coupling 51, the low speed fluid feed line 54 is closed through operation of the rotary valve 54A permitting the coupling 51 to empty. Upon the rotary valve 54A closing the low speed pressure line 54, the pressure in passage 270 increases to a value sufficient to cause the shifting of the shuttle valve 290 previously described and the fluid pressure in the passage 270 maintains the shuttle valve 290 in the latter shifted position until such time as the high speed drive operation is terminated.

If desired a separate throttling valve may be provided for each flow control port. In this way a constant differential can be provided at the metering port feeding passage 270 and similarly a constant pressure differential can be supplied across the port feeding passage 271. The throttling may be provided either by throttling the fluid medium entering the metering valve or by feeding engine oil pressure into the metering valve and throttling the flow through passage 270 or 271 as required.

*Follow-up mechanism*

When valve 250 is moved from one position to another, there is an elapse of time required to flow the fluid medium into the hydraulic coupling 39 or 51 to bring the coupling to the particular slip condition required, and for the supercharger to cause the intake manifold pressure to rise to the selected value. This time lag tends towards instability and in order to provide a stabilizing action a follow-up mechanism 300, as shown in Figure 2a, has been provided in the hydraulic circuit of the metering valve 250.

The follow-up mechanism 300 includes a valve chamber 300A in which there is slidably mounted an adjustable valve-piston 301. Extending longitudinally in the valve-piston 301 is a passage 302 having a valve opening 303 at the upper end.

The valve opening 303 is controlled by a valve member 304 mounted on a stem 305 extending longitudinally through the passage 302 and fixedly mounted at opposite ends of the valve chamber 301. There is provided a slight clearance between the defining surface of the valve opening 303 and the valve member 304 sufficient to permit a limited passage of the fluid medium or oil. The stem 305, as shown in Figure 2a, is positioned in spaced relation to the inner surface of the passage 302 so as to permit passage of the pressure medium such as oil upon opening of the valve opening 303.

The follow-up valve-piston 301 is centered by the action of a spring 306 which bears at one end upon an annular plate 307 slidably mounted within a portion of the valve chamber and engaging a shoulder 308 formed on the valve 301. Movement of the plate 307 is limited by another shoulder formed within the valve chamber. The opposite end of the spring 306 bears upon a similar annular plate 309 slidably mounted within a portion of the valve chamber but similarly limited by a shoulder portion formed within the valve chamber. The plate 309 is engaged by a nut 310 provided at the lower end of the piston-valve 301. The annular plates 307 and 308 are slidably mounted on the piston valve 301 and are biased in opposite directions into engagement with the shoulder 308 and nut 310 respectively.

An annular recess 311 is formed in the piston-valve 300 and opening into the valve chamber 300A at a point adjacent the recess is the fluid pressure passage 82. Passages 270 and 271 also open into the valve chamber but are closed by the piston-valve 300 upon the same being positioned in the neutral position shown in Figure 2a.

Opening at opposite ends of the valve chamber 300A are the passages 66 and 275. The passage 66 leads from the servo valve 103 while the passage 275 leads from the lower end of the metering valve 250 as previously explained.

The amount of follow-up action effected by the mechanism 300 is determined by the speed of movement of the metering valve 250, since the quantity of fluid medium or oil flowing through the lines 66 and 275 to and from the follow-up mechanism is determined by the displacement of the metering valve 250. The follow-up piston-valve 301 is biased to a neutral position by the action of spring 306 so that when metering valve 250 moves downward, follow-up piston-valve 301 due to the pressure acting on the lower end thereof moves upward and upon valve 250 moving upward the follow-up piston-valve 301 moves downward.

When the follow-up piston-valve 301 reaches a maximum permissible travel, the fluid medium or oil is by-passed through valve opening 303 which is opened by valve member 304.

During operation when only partial movement results, the oil is by-passed through the clearance between the surface defining the valve opening 303 and the valve member 304 allowing the follow-up piston valve 301 to be returned to a neutral position under the biasing force of spring 306.

When a great increase in the intake manifold pressure is required, the metering valve 250 will be subjected to a high pressure differential by the servo valve 103 and the metering valve will move downward rapidly causing the follow-up piston-valve 301 to move upward to its full extent. The latter action will not only open valve 303 but will also open the ports in the valve chamber 300A leading to the passages 270 and 271 to the pressure medium supplied the valve chamber 300A by passage 82 so as to permit the pressure medium to be valved into the high and low speed coupling passages 270 and 271 respectively to provide acceleration of the couplings 39 and 51.

The follow-up action of the piston-valve 301 is transmitted by links 315 to follow-up lever 186. Follow-up lever 186 is pivotally supported by pin 185 which is freely rotatable in the tubular member 184 and lever 182. The follow-up lever 186 has the link 187 eccentrically connected thereto so as to transmit the motion of the follow-up lever 186 to the selector whiffletree beam 135. Thus upon the metering valve 250 moving downward to increase the manifold pressure the follow-up piston valve 301 moves upward causing the follow-up lever 186 to move in a clockwise direction about the pin 185 and moving the whiffletree selector beam 135 in a counter-clockwise direction about the pin 146 so as to decrease the pressure setting. Likewise upon the metering valve 250 moving in an upward direction to decrease the manifold pressure the follow-up lever is moved so as to increase the pressure setting and thereby providing novel follow-up action for preventing instability of the control unit A.

Operation

It will be seen from the foregoing that there is provided a novel hydraulically operated control unit including a main control lever 3 and cruise override control lever 152. In addition there are provided the lever 61 for controlling the carburetor throttle 59 and a pulley 17 for connection to the propeller governor.

Movement of the main control lever 3 operates the propeller governor pulley 17 through a linkage mechanism 5 and positions the pulley 17 mechanically to the required speed setting. At the same time a cam 136 sets the pressure controlling element 133 to the desired intake manifold pressure, while a second cam 195 sets the altitude droop mechanism 170 so as to correct for droop in such intake manifold pressure due to change in the altitude of the aircraft. Further a linkage positions the throttle 59 through operation of the throttle servo valve 103 and piston 64 to a predetermined open position.

In the automatic operating range of the unit (above the idling pressure range determined by bellows stem 128) the throttle opening will not be sufficient to provide the manifold pressure selected. Consequently the throttle actuating servo 64 automatically opens the throttle 59 further to give the selected pressure. A a given position of the main control lever 3 the pressure and engine speed will be kept constant within the limitations of altitude and the variations provided by the altitude droop mechanism 170. Thus the main control lever 3 provides correlated selection of manifold pressure and engine speed.

The cruise override control 152 permits variation of the manifold pressure selection in the cruising range of pressures to provide maximum fuel economy for long range cruising. When the cruise override bell crank 155 is moved in a counter-clockwise direction, the pressure selection throughout the entire movement of the pilot's control is set below a predetermined value. This serves to lock the unit into manual operation through the effect of the limit stem 128 so as to permit ground checking of magnetos and reduction of selected pressure in an emergency, where it is desired to keep engine speed selection to a high value.

The engine power control A is arranged for operation with a variable speed supercharger drive including high and low speed hydraulic drives 39 and 51 respectively. The engine power control provides automatic control of the drive by operation of a flow control valve 250. In maintaining automatic control of the manifold pressure when the throttle 59 reaches the wide open position, the flow control valve 250 is adjusted by increased hydraulic pressure so as to cause the supercharger speed to increase until the selected manifold pressure is reached.

Further the control is provided with a novel device 215 for resetting the selected intake manifold pressure upon operation of the fluid injection system controlled by the position of the pilot's control lever 1. Through the latter novel control dry operation may be maintained throughout a predetermined operating range of lever 1 of, for example, from 0° to a 63° angular position of the pilot's lever 1. Within a second predetermined range of for example from 63° to 72° the throttle lever 1 closes a switch 210A effecting operation of the injection system. During the latter operation the intake manifold pressure setting is increased to a predetermined value which may be adjusted by adjusting the lever 1 within the second predetermined range. However, in the event of injection fluid pressure or supply failure the intake manifold pressure is automatically reset to the maximum dry rating through operation of the device 215.

It should be further noted that when hydraulic pressure is available, the throttle is positioned by the hydraulic servo piston 64 even in the manual range.

Thus upon manual adjustment of the shaft 4 in a counter-clockwise direction past a predetermined critical low pressure setting position, the cam 136 positions the pin 134 so that the valve stem 103 is raised above its neutral position, while the pin 128 locks the bellows 126 out of operation in a pressure decreasing direction and is thus ineffective for returning the valve stem 103 to a neutral position.

The latter upward adjustment of the valve stem 103 opens port 66 to the pressure medium supplied through line 82 so that pressure is applied to piston 64 at the upper side tending to move piston 64 in a downward direction and actuating arm 69 in a counter-clockwise direction. Such counter-clockwise movement of arm 69 adjusts throttle arm 61 in a throttle closing direction and acts through interconnecting linkages 73, 72 and 71 so as to move arm 74 in a clockwise direction and thereby actuate the plunger 100 downward to return the valve stem 103 to a neutral position.

Further manual adjustment of the shaft 4 and the arm 70 in a counter-clockwise direction causes the arm 74 to be moved in a counter-clockwise direction so that plunger 100 releases valve stem 103 whereupon leaf spring 104 raises the same so as to permit the pressure medium to be applied to the upper side of piston 64 causing further counter-clockwise movement of the arm 69 so that the arm 74 once more resets the valve stem 103 to a neutral position and effects further adjustment of the throttle arm 61 in a valve closing direction.

Of course upon manual adjustment of the arm 70 within the automatic lock out range in a clockwise direction, there will be effected a clockwise movement of arm 74 past the critical neutral position causing valve stem 103 to be lowered whereupon piston 64 will actuate arm 69 in a clockwise direction moving arm 74 in a counter-clockwise direction so that the valve stem 103 will be returned to a neutral position and the throttle arm 61 adjusted in a valve opening direction. Upon the shaft 4 being adjusted in a clockwise direction past the limit of the automatic lock out range, the mechanism will once again be placed in automatic operation controlled by the pressure selector cam 136.

In the event of a hydraulic pressure failure the novel manually operable mechanical linkage 70, 71, 72, 73 and 74 is arranged so as to provide direct manual throttle control as heretofore explained. This linkage is particularly effective at the time of starting the aircraft engine. The manual throttle travel is sufficient to give normal power at take-off engine speed at sea level.

During normal operation of the engine cruise override control 150 will be kept at its neutral position and both engine speed and manifold pressure will be controlled and selected together by the single pilot's control lever 1.

Constant manifold pressure and engine speed will be obtained at fixed pilot's control lever 1 positions up to critical altitude except as limited by the novel altitude droop device 170 and as momentarily effected by the novel follow-up device 300. The altitude droop mechanism serves to prevent the intake manifold pressure obtained through the control of the supercharger speed and throttle valve from exceeding values required for the safe operation of the engine without liquid injection at the prevailing altitude of the aircraft as described and claimed in the copending divisional application Serial No. 111,896, filed August 23, 1949, by Howard A. Alexanderson and Robert Z. Hague and assigned to Bendix Aviation Corporation.

Although only one embodiment of the invention has been described and illustrated in detail, it is to be expressly understood that the same is not limited thereto. Various changes may be made in design and arrangement of the parts illustrated, as well be apparent to those skilled in the art. For a definition of the limits of the invention, reference should be had to the appended claims.

What is claimed is:

1. An engine control system comprising pilot controlled means for selecting a desired intake manifold pressure for the engine, a throttle valve for controlling the intake manifold pressure, a supercharger for supplying air to the intake manifold of the engine, a first hydraulic motor means for positioning the throttle, intake manifold pressure responsive means for controlling the hydraulic motor means, hydraulic coupling means for driving the supercharger from the engine, hydraulic flow control means for regulating the flow of hydraulic medium to the coupling means and thereby the speed of said supercharger, a second hydraulic motor means for positioning said flow control means, and said second hydraulic motor means being controlled by said intake manifold pressure responsive means so as to maintain said selected pressure.

2. An engine control system comprising pilot operative means for selecting a desired manifold pressure for the engine, a throttle valve for controlling the manifold pressure, manifold pressure responsive means for adjusting said throttle valve so as to maintain the selected manifold pressure, a supercharger for maintaining the manifold pressure in accordance with the selected pressure, variable speed driving means for said supercharger, means for controlling said variable speed driving means, said control means being regulated by said manifold pressure responsive means, and follow-up means responsive to actuation of said control means for effecting said variable speed driving means so as to cause a more rapid acceleration of said supercharger upon the selected manifold pressure being greatly in excess of the actual manifold pressure.

3. An engine control system comprising pilot operative means for selecting a desired manifold pressure for the engine, a throttle valve for controlling the manifold pressure, manifold pressure responsive means for adjusting said throttle valve so as to maintain the selected manifold pressure, a supercharger for maintaining the manifold pressure in accordance with the selected pressure, variable speed driving means for said supercharger, means for controlling said variable speed driving means, said control means being regulated by said manifold pressure responsive means, follow-up means responsive to actuation of said control means for effecting said variable speed driving means so as to cause a more rapid acceleration of said supercharger upon the selected manifold pressure being greatly in excess of the actual manifold pressure, and said follow-up means being arranged so as to simultaneously actuate said pressure selecting means so as to momentarily decrease the value of the selected manifold pressure.

4. A device of the character described, comprising, in combination, a condition responsive means, hydraulic motor means, valve means for controlling said motor means, resilient means operably connecting said condition responsive means to said valve means, a first adjustable element, a second element adjustably positioned by said motor means, means operably connecting said first and second elements to said control valve means in such a manner that said elements within a limited range may so adjust said valve means as to override said condition responsive means and cause said motor means to adjust the position of said second element in direct relation to the adjusted position of said first element.

5. A device of the character described, comprising, in combination, a condition responsive means, hydraulic motor means, valve means for controlling said motor means, resilient means operably connecting said condition responsive means to said valve means, a first adjustable element, a second element adjustably positioned by said motor means, means operably connecting said first and second elements to said control valve means in such a manner that said elements within a limited range may so adjust said valve means as to override said condition responsive means and cause said motor means to adjust the position of said second element in direct relation to the adjusted position of said first element, and means for changing the datum of said condition responsive means, said datum changing means operably controlled by said first adjustable element.

6. The combination defined in claim 5 in which the means operably connecting said first and second elements to said control valve includes a walking beam operably connected to said first and second elements and said control valve.

7. An engine control device comprising a first piston, a second piston, a common pressure chamber for said pistons, means controlling the pressure applied to said chamber, said first piston being actuated in a first sense at a predetermined pressure controlled by said means, and said second piston being actuated in a second sense at a greater predetermined pressure upon said first piston being actuated in said first sense to the limit of its movement, a first member positioned by one of said pistons to adjust an induction throttle valve in the engine, and a second member adjustably positioned by the other of said pistons for controlling the driven speed of an engine supercharger.

8. A regulator for the induction system of a supercharged aircraft engine, comprising a first piston, a second piston, a common hydraulic pressure chamber for said pistons, induction pressure responsive means for controlling the hydraulic pressure applied to said chamber, said first piston arranged to be actuated in a first sense at a first hydraulic pressure, said second piston arranged to be actuated in a second sense at a greater hydraulic pressure upon said first piston being actuated in said first sense to a maximum limit, a member positioned by said first piston to adjust an induction throttle valve for said engine, a flow control valve adjustably positioned by the second piston for controlling the flow of a fluid medium to a hydraulic coupling drive for the engine supercharger.

9. A regulator for the induction system of a supercharged aircraft engine, comprising a first piston, a second piston, a common hydraulic pressure chamber for said pistons, induction pressure responsive means for controlling the hydraulic pressure applied to said chamber, said first piston arranged to be actuated in a first sense at a first hydraulic pressure, said second piston arranged to be actuated in a second sense at a greater hydraulic pressure upon said first piston being actuated in said first sense to adjust an induction throttle valve for said engine, another member adjustably positioned by the second piston for controlling the driven speed of an engine supercharger, means for changing the datum of the pressure responsive means, and a follow-up valve hydraulically coupled to said pistons for operating said datum changing means so as to prevent hunting of said pressure responsive means upon change in the induction pressure.

10. A regulator for the induction system of a supercharged aircraft engine, comprising a first piston, a second piston, a common hydraulic pressure chamber for said pistons, induction pressure responsive means for controlling the hydraulic pressure applied to said chamber, said first piston arranged to be actuated in a first sense at a first hydraulic pressure, said second piston arranged to be actuated in a second sense at a greater hydraulic pressure upon said first piston being actuated in said first sense to adjust an induction throttle valve for said engine, another member adjustably positioned by the second piston for controlling the driven speed of an engine supercharger, means for changing the datum of the pressure responsive means, a follow-up valve hydraulically coupled to said pistons for operating said datum changing means so as to prevent hunting of said pressure responsive means upon change in the induction pressure, and said follow-up valve independently controlling the driven speed of said engine supercharger so as to effect an acceleration of said supercharger upon a relatively great increase in the induction pressure being required.

11. The combination comprising a piston slidably mounted in a pressure chamber, said pressure chamber having hydraulic pressure inlet and outlet openings at opposite ends for effecting movement of said piston, said piston having a longitudinal passage formed therein, said passage opening at the opposite ends of said piston, a stem mounted in said chamber and extending through the longitudinal passage formed in said piston, a valve member fixedly mounted on said stem and arranged to control the flow of fluid medium through said passage, said valve arranged to open said passage upon movement of said piston to one end of said chamber so as to equalize the hydraulic pressure at opposite ends of the piston, spring means for returning the piston to a neutral position, and control means operated by said piston.

12. The combination comprising a piston slidably mounted in a pressure chamber, said pressure chamber having hydraulic pressure inlet and outlet openings at opposite ends for effecting movement of said piston, said piston having a longitudinal passage formed therein, said passage opening at the opposite ends of said piston, a stem mounted in said chamber and extending through the longitudinal passage formed in said piston, a valve member fixedly mounted on said stem and arranged to control the flow of fluid medium through said passage, said valve arranged to open said passage upon movement of said piston to one end of said chamber so as to equalize the hydraulic pressure at opposite ends of the piston, a first annular plate about said piston, said piston and chamber having parts for limiting movement of said first plate in one direction, a second annular plate about said piston, said piston and chamber having other parts for limiting movement of said second plate in an opposite direction, a spring interposed between said first and second plates for normally biasing said plates into contacting relation with said parts so as to maintain the piston in a position intermediate the opposite ends of said chamber, and mechanical and hydraulic control means operated by said piston.

13. An aircraft power unit comprising, in combination an internal combustion engine, a governor to control the engine speed, an induction throttle valve, a supercharger, means for driving said supercharger, means for changing the driven speed of said supercharger, a regulating device responsive to the induction pressure of the engine to selectively and progressively control said induction throttle and said speed changing means, a master control device under the control of the pilot for simultaneously changing the datum of the governor and the datum of the regulating device so as to maintain a predetermined relationship between engine speed and induction pressure, and a second pilot operated means alternately operable for increasing or decreasing such predetermined relationship between engine speed and induction pressure independently of the operation of said master control device.

14. A device of the character described, comprising manually operable means for selecting a desired engine intake manifold pressure, a hydraulic motor means for regulating the intake pressure, intake manifold pressure responsive means for controlling the hydraulic motor means, and means actuated by said manually operable means for rendering said pressure responsive means ineffective for controlling said motor means within a predetermined operating range of said manually operable means, and said actuating means so arranged that said motor means may be controlled directly by said manually operable means within said predetermined operating range.

15. A device of the character described, comprising manually operable means for selecting a desired engine intake manifold pressure, a hydraulic motor means for regulating the intake pressure, intake manifold pressure responsive means for controlling the hydraulic motor means, a piston subject to the operating pressure for said motor means, spring means biasing said piston in a direction opposing said operating pressure, means actuated by said piston upon pressure failure for rendering said pressure responsive means ineffective for controlling said motor means, and means interconnecting said manually operable means to said motor means for effecting manual operation of said motor means upon such pressure failure.

16. A device of the character described, comprising, in combination, condition responsive means, hydraulic motor means automatically controlled by said condition responsive means for adjusting a control device, a control member for varying the datum of said condition responsive means, means for limiting the control of said motor means by said condition responsive means upon adjustment of said control member within a predetermined datum setting range, and means operated by said member for controlling said motor means so as to position said control device in direct relation to the adjusted position of said control member within said predetermined range.

17. The combination comprising a condition responsive means, hydraulic motor means for adjusting a control device, a valve means for controlling said motor means, an adjustable control element, first means operably connecting said element to said condition responsive means for varying the datum thereof, said first connecting means including means jointly connecting said condition responsive means and said element to said control valve means, means for limiting the adjustment by said condition responsive means of said control valve means, and second means connecting said element to said control valve means, said second connecting means operable within a predetermined limited range of adjustment of said element and coacting with said first connecting means and said limiting means so as to control said motor means in such a manner as to adjust said control device in direct relation to the adjusted position of said main control element.

18. For use with an internal combustion engine having a throttle-controlled induction passage provided with a supercharging system including a supercharger and fluid coupling means for varying the ratio of engine-to-supercharger speed; the combination comprising means for regulating hydraulic flow of said fluid coupling including a flow metering valve, a servo piston for operative connection to said throttle for actuating the same and another servo piston arranged to position said metering valve, a servo valve controlling admission of operating pressure to said pistons, a device responsive to changes in manifold pressure, means providing an operating connection between said device and said servo valve whereby the throttle may be automatically positioned to maintain a predetermined manifold pressure up to charging capacity for approximately wide-open throttle and said metering valve thereafter regulated to produce a supercharger speed such as will maintain the predetermined charging pressure.

19. Control mechanism for regulating the charging pressure supplied to an internal combustion engine comprising manifold pressure responsive means, means for changing the datum of said pressure responsive means, a piston operatively connected to the datum changing means and hydraulically coupled to said pressure responsive means, said piston movable upon changes in the charging pressure so as to tend to momentarily reset the datum changing means in a direction opposite the direction of change in manifold pressure, said piston having a bleed passage, and spring means for returning said piston to a neutral position upon cessation of change in said charging pressure.

20. The combination defined by claim 19 including a valve member controlling said bleed passage in accordance with the extent of change in the charging pressure.

21. Control mechanism for regulating the charging pressure supplied to an internal combustion engine comprising manifold pressure responsive means, means for changing the datum of said pressure responsive means, and means hydraulically coupled to said pressure responsive means operative during changes in charging pressure and tending to momentarily reset the datum changing means in a direction opposite to the direction of change in manifold pressure.

22. For use with an internal combustion engine having a throttle-controlled induction passage provided with a supercharging system including a supercharger and fluid coupling means for varying the ratio of engine-to-supercharger speed, power control mechanism including a manually operable power control member, means for regulating the fluid flow to said fluid coupling means, hydraulic means for selectively operating said throttle and fluid regulating means, said hydraulic means including a first piston for operating the throttle and a second piston for operating said fluid regulating means, a servo valve for controlling said hydraulic means, variable datum means including a device responsive to changes in manifold pressure and an element adjustable by said power control member to set the datum for said device, and means providing an operative connection between said pressure-responsive device and said servo valve to control said hydraulic means and thereby selectively cause said first piston to be automatically positioned to maintain the selected manifold pressure up to capacity for approximately wide-open throttle and said fluid regulating means to be thereafter controlled by said second piston to provide a supercharger speed which will maintain the required charging pressure.

23. For use with an internal combustion engine having a throttle-controlled induction passage provided with a supercharging system including a supercharger and fluid coupling means for varying the ratio of engine-to-supercharger speed, power control mechanism including a manually operable control member, means for regulating hydraulic flow to said fluid coupling including a flow metering valve, a servo piston operatively connected to said throttle for actuating the same and another servo piston arranged to position said metering valve, a servo valve controlling admission of operating pressure to said pistons, variable datum means including a device responsive to changes in manifold pressure and an element adjustable by said power control member to set the datum for said device, means providing an operating connection between said device and said servo valve whereby the throttle is automatically positioned to maintain a selected manifold pressure up to charging capacity for approximately wide-open throttle and said metering valve is thereafter regulated to produce a supercharger speed such as will maintain the required charging pressure.

24. Control mechanism for regulating the charging pressure supplied to an internal combustion engine comprising variable datum means including a capsule responsive to changes in manifold pressure, means for adjusting the datum of said capsule, and means becoming operative during changes in charging pressure tending to momentarily reset the datum in a direction opposite the direction of change in manifold pressure as the charging pressure approaches the value set by said adjusting means.

25. Control mechanism for regulating the charging or manifold pressure of an internal combustion engine comprising variable datum means including a capsule responsive to changes in manifold pressure, means for adjusting the datum of the capsule, and means becoming operative as a result of changes in manifold pressure and varying substantially as the rate of change tending to momentarily reset the datum in a direction toward the actual manifold pressure, causing said capsule to return to its normal or neutral position earlier and thereby prevent "overshooting" of the manifold pressure beyond the value set by said adjusting means.

26. In control mechanism for regulating the charging or manifold pressure of a supercharged internal combustion engine having a throttle controlled induction passage, variable datum means including a capsule responsive to changes in manifold pressure, means for adjusting the datum of said capsule, a servo motor for varying the position of the throttle, a servo valve for regulating hydraulic flow to said servo motor, means operatively connecting said servo valve to said variable datum means to be regulated thereby, and fluid pressure means adapted to prevent overshooting of the manifold pressure when the datum is changed by momentarily changing the datum setting in a direction counter to the adjustment and becoming decreasingly effective as the manifold pressure approaches the datum setting.

27. For use with an engine having an air intake system provided with a supercharger and a hydraulic coupling for transmitting a driving force to said supercharger at variable ratios of engine-to-supercharger speed, a power control device including a flow regulating or metering valve for regulating the flow of fluid to said coupling, said valve having a member movable to different positions to vary the rate of fluid flow, means for subjecting said member to an operating pressure medium, means responsive to changes in pressure in the air intake system for controlling the application of said medium, and means for automatically rendering the operating pressure medium effective to accelerate the rate of movement of said member when the member is initially moved coincident with a change in the air intake pressure.

28. In a control apparatus, a member including an expansible chamber sensitive to deviation of the controlled variable from a selected value providing fluid pressure to a control element such that the fluid pressure and the controlled element motion are proportional to the deviation, a reset means including a piston responsive to changes in said fluid pressure, a constant effort means applied to said reset means so that the reset means is static whenever fluid pressure corresponding to zero deviation obtains, a flow restriction for damping the motion of said reset means, said element and said reset means cooperating to regulate the controlled variable.

29. In a control apparatus, a control element and a reset means which cooperate to regulate the value of a controlled variable, means including an expansible chamber for determining the position of said element in accordance with the deviation of the controlled variable from a selected value, a member sensitive to said deviation, means associated with said member for creating a fluid pressure difference which varies either in a positive or negative sense with changes in the position of said member on either side of a position corresponding to zero deviation of said variable, means for moving said reset means by said pressure difference, and a flow restriction for damping the motion of said reset means.

30. An engine control system comprising pilot controlled means for selecting a desired intake manifold pressure for the engine, a throttle valve for controlling the intake manifold pressure, a supercharger for supplying air to the intake manifold of the engine, a first hydraulic motor means for positioning the throttle, intake manifold pressure responsive means for controlling the hydraulic motor means, hydraulic coupling means for driving the supercharger from the engine, hydraulic flow control means for regulating the flow of hydraulic medium to the coupling means and thereby the speed of said supercharger, a second hydraulic motor means for positioning said flow control means, said second hydraulic motor means being controlled by said intake manifold pressure responsive means so as to maintain said selected pressure, and follow-up means for varying the setting of said pressure responsive means in accordance with change in hydraulic pressure effecting said second hydraulic motor means.

31. An engine control system comprising pilot operative means for selecting a desired manifold pressure for the engine, a throttle for controlling the manifold pressure, manifold pressure responsive means for adjusting said throttle valve so as to maintain the selected manifold pressure, a supercharger for maintaining the manifold pressure in accordance with the selected pressure, variable speed driving means for said supercharger, hydraulic motor means for controlling said variable speed driving means, and said controlling means being regulated by said manifold pressure responsive means upon said throttle being adjusted to a maximum open position, and follow-up means for varying the setting of said pressure responsive means in accordance with change in hydraulic pressure affecting said hydraulic motor means.

32. The combination defined by claim 31 in which there is provided means for resetting the follow-up means, and means for controlling the resetting means operated by said follow-up means.

33. A regulator for the induction system of a supercharged aircraft engine, comprising a first piston, a second piston, a common hydraulic pressure chamber for said pistons, induction pressure responsive means for controlling the hydraulic pressure applied to said chamber, said first piston arranged to be actuated in a first sense at a first hydraulic pressure, said second piston arranged to be actuated in a second sense at a greater hydraulic pressure upon said first piston being actuated in said first sense to adjust an induction throttle valve for said engine, another member adjustably positioned by the second piston for controlling the driven speed of an engine supercharger, means for changing the datum of the pressure responsive means, a follow-up piston hydraulically coupled to said second piston, means connecting said follow-up piston to said datum changing means so as to prevent hunting of said pressure responsive means upon a change in the greater hydraulic pressure affecting said second piston.

34. An aircraft engine control system comprising pilot-controlled means for selecting a desired intake manifold pressure for the engine, a throttle valve for controlling the intake manifold pressure, a supercharger for supplying air to the intake manifold of the engine, servo motor means for positioning the throttle, intake manifold pressure responsive means for controlling the servo motor means, a plurality of hydraulic couplings between the supercharger and the engine, means for controlling flow of pressure fluid to effect selective operation of said hydraulic couplings, said controlling means being regulated by said manifold pressure responsive means upon said throttle being adjusted to a maximum open position to vary the supply of pressure fluid to the selected coupling so as to drive the supercharger at a speed necessary to obtain the desired intake manifold pressure.

35. For use with an internal combustion engine having an air intake system provided with a supercharger and a hydraulic coupling for transmitting a driving force to said supercharger at variable ratios of engine-to-supercharger speed, a power control device including a flow regulating or metering valve for regulating the flow of hydraulic fluid to said coupling, means responsive to changes in the air intake pressure for moving said valve to different flow regulating positions, means for resetting said valve to a definite flow regulating position after having been initially moved, means for regulating the resetting action including a bleed, and an accelerating device for accelerating the resetting movement of said valve, said device including means for temporarily varying said bleed.

References Cited in the file of this patent

UNITED STATES PATENTS

| Number | Name | Date |
|---|---|---|
| 773,365 | Atkins | Oct. 25, 1904 |
| 1,225,442 | Konar | May 8, 1917 |
| 1,586,136 | Winterborne | May 25, 1926 |
| 2,087,885 | Fleischel | July 27, 1937 |
| 2,125,361 | Schwarzler | Aug. 2, 1938 |
| 2,217,364 | Halford et al. | Oct. 8, 1940 |
| 2,228,239 | Ammann | Jan. 14, 1941 |
| 2,246,169 | Ericson | June 17, 1941 |
| 2,284,795 | Belaef | June 2, 1942 |
| 2,301,816 | Rubly | Nov. 10, 1942 |
| 2,372,989 | Udale | Apr. 3, 1945 |
| 2,377,300 | Pray | May 29, 1945 |
| 2,389,003 | Schorn | Nov. 13, 1945 |
| 2,390,119 | Nisbet et al. | Dec. 4, 1945 |
| 2,396,618 | Stieglitz et al. | Mar. 12, 1946 |
| 2,400,306 | Hobbs | May 14, 1946 |
| 2,400,307 | Hobbs et al. | May 14, 1946 |